(No Model.)
M. PIERCE.
EARTH OR SAND AUGER.
No. 532,738.  Patented Jan. 15, 1895.
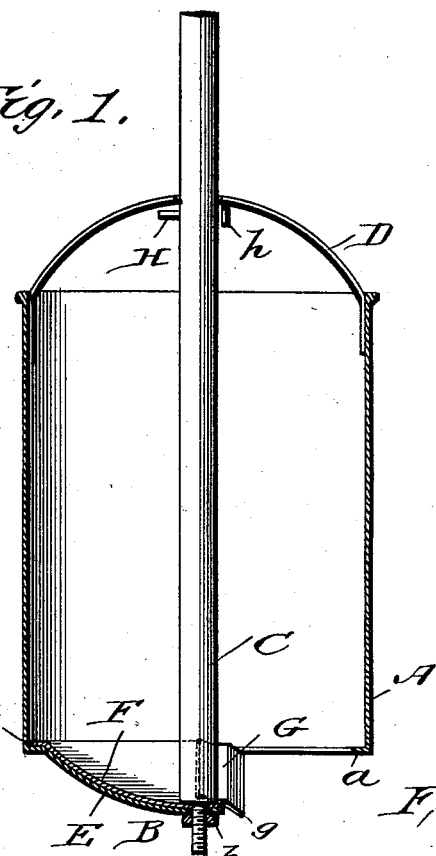
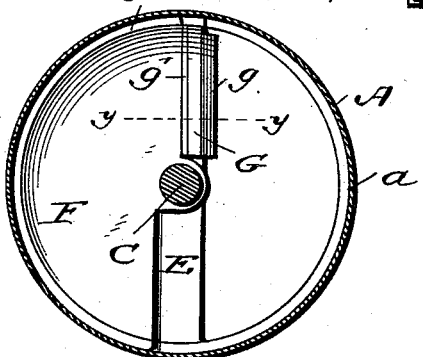
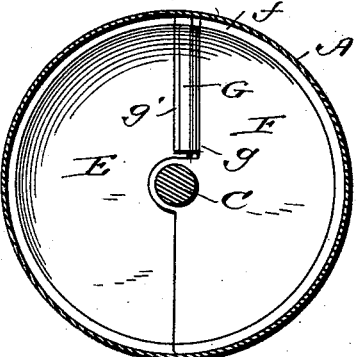
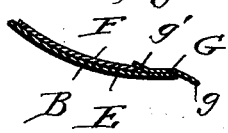
Witnesses  Inventor
Mel Pierce

UNITED STATES PATENT OFFICE.

MEL PIERCE, OF NEW HARTFORD, IOWA.

EARTH OR SAND AUGER.

SPECIFICATION forming part of Letters Patent No. 532,738, dated January 15, 1895.

Application filed May 2, 1894. Serial No. 509,840. (No model.)

*To all whom it may concern:*

Be it known that I, MEL PIERCE, a citizen of the United States, residing at New Hartford, in the county of Butler and State of Iowa, have invented certain new and useful Improvements in Earth or Sand Augers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The purpose of the present invention is the provision of an auger for boring earth and particularly sand and clay and which will readily and easily penetrate such earthy substances and remove the same from the hole on withdrawing the tool.

An essential feature of the improvement is a bulging bottom constructed in halves or sections, one half or section being movable and constituting a cut-off to close the barrel when it is desired to lift the auger from the hole, and attached to and operated by the shaft. The bulging of the bottom facilitates the work of the device and enables it to penetrate into sand and clay readily and quickly.

The improvement consists of the novel features which hereinafter will be more fully described and claimed, and which are shown in the annexed drawings, in which—

Figure 1, is a vertical central section of an auger embodying the invention. Fig. 2, is a horizontal section on the line X—X of Fig. 1, the bottom being open. Fig. 3, is a view similar to Fig. 2, the bottom being closed, and Fig. 4, is a detail section on the line Y—Y of Fig. 2 showing the cutter or bit and the movable section or cut-off limited in its movement thereby.

The bottom or case A is open at the top and closed at the bottom by an outwardly bulging bottom B and is provided with a centrally disposed shaft C by means of which the auger is raised and lowered, rotated in the opening and to which the cut-off or removable section of the bottom is attached and operated. A cross bar D extends across the upper end of the barrel and is centrally apertured to provide a bearing for the shaft C which turns therein in operating the cut-off. This cross bar bulges outward and has its ends bent and secured to the barrel by bolts or other suitable fastening means.

The bottom B is composed of two halves or sections E and F, the section E being permanently attached to the lower edge of the barrel. The section F is movable and constitutes the cut-off and is adapted to move over the section E and lie close upon the latter, and is fixedly attached to the lower end of the shaft C so as to turn therewith. Each of the sections E and F has its edge portion approximately horizontal, the horizontal edge portion *f* of the cut-off being adapted to overlap and rest upon an inner flange *a* at the outer edge of the opening provided in the bottom to be closed by the said cut-off. By this means the cut-off is supported at its outer edge and enabled to sustain the load. The shaft passes loosely through an opening in the section E and its projecting end has a stop *b* which causes the barrel to lift when elevating the shaft C.

The cutter or bit G is attached to one end of the section E and conforms to the bulge or outline of the said section. One edge *g* of the bit is deflected outward to bite into the earth and scoop the same up. The other edge *g'* is bent up slightly to engage one edge of the cut-off and limit the same in its movements and slightly overlapping the said edge prevents the earth wedging between the two sections, or the edge of the section F obstructing the free passage of the earth into the barrel. A pin H projecting laterally from the shaft is adapted to engage with a pin projecting from the cross bar D both pins constituting stops to supplement the action of the upturned edge *g'* of the bit or cutter and distributing the strain equally on the auger. The pin or stop H coming below the cross bar D also assists in holding the barrel on the shaft when lifting the latter.

The operation of the invention is as follows: The shaft C being rotated to the right moves the cut-off until its edge engages with the bent edge *g'* of the bit and the stops H and *h* engage when the barrel will rotate with the shaft, the bit scraping up the earth and the latter will enter the barrel. After the latter is full the shaft C is turned in a reverse direction of one half a revolution. This closes the cut-off and on lifting the shaft the barrel with its load is elevated from the hole and the earth dumped in the usual manner. This operation is repeated until the hole attains a proper depth.

Having thus described my invention, what I claim as new, and desire to secure by Letters Patent, is—

1. An earth auger composed of a cylinder having a convex or bulging bottom, composed of two semi-circular sections, the one fixed the other slidable and adapted to be slid over the fixed section by a turning movement, an operating shaft for turning the said slidable section, and a bit applied to the forward edge of the fixed section and having its inner edge portion bent up to engage with the projection over the edge of the slidable section to limit the movement of the said slidable section when turned open and prevent the lodgment of dirt between the fixed and movable sections in the boring operation of the device, substantially as described.

2. The herein shown and described earth auger composed of a barrel having a bulging or convex bottom formed of two semi-circular sections, one fixed, the other movable and constituting a cut off, the lower edge of the barrel opposite the fixed section having an inner flange for the movable section to rest upon at its outer edge, an operating rod attached to the movable section, and a bit secured to one end of the fixed section and having its inner edge bent up and adapted to overlap and protect the contiguous end of the movable section, substantially as specified.

In witness whereof I affix my signature in presence of two witnesses.

MEL PIERCE.

Witnesses:
E. L. PIERCE,
O. H. HAMMOND.